(12) United States Patent
 Ozdemir

(10) Patent No.: US 8,243,194 B2
(45) Date of Patent: Aug. 14, 2012

(54) METHOD AND APPARATUS FOR FRAME INTERPOLATION

(75) Inventor: Huseyin Ozdemir, Istanbul (TR)

(73) Assignee: Vestel Elektronik Sanayi ve Ticaret A.S., Manisa (TR)

( * ) Notice: Subject to any disclaimer, the term of this patent is extended or adjusted under 35 U.S.C. 154(b) by 1448 days.

(21) Appl. No.: 11/753,354

(22) Filed: May 24, 2007

(65) Prior Publication Data

US 2008/0008243 A1    Jan. 10, 2008

Related U.S. Application Data

(60) Provisional application No. 60/803,538, filed on May 31, 2006.

(51) Int. Cl.
 *H04N 7/01* (2006.01)
(52) U.S. Cl. .......... 348/441; 348/169; 375/240.16; 375/240; 375/240.24; 375/240.01; 382/173
(58) Field of Classification Search .......... 348/441
 See application file for complete search history.

(56) References Cited

U.S. PATENT DOCUMENTS 7,180,548 B2 * 2/2007 Mishima et al. .......... 348/441
2003/0194151 A1 * 10/2003 Wang et al. .......... 382/300

FOREIGN PATENT DOCUMENTS

EP      0720377        7/1996
EP      720377 A2 *    7/1996

OTHER PUBLICATIONS

Suk Byung Chae et al: "Video Coding by Segmenting Motion Vectors and Frame Differences" Apr. 1, 1993 Optical Engineering, SOC. of Photo-Optical Instrumentation Engineers. Bellingham, US. vol. 32, No. 4 pp. 870-876.*
Suk Byung Chae, Joon-Seekk Kim, Rae HOng Park, "Video coding by segmenting motion vectors and frame differences", Apr. 1993, Optical Engineering, vol. 32 No. 4, pp. 870-876.*
Chae, Suk Byung, et al; Video Coding by Segmenting Motion Vectors and Frame Differences; Optical Engineering, Soc. of Photo-Optical Instrumentation Engineers; Bellingham, WA, US, vol. 32, No. 4, Apr. 1993, pp. 870-876.
Hotter, Michael, et al; Image Segmentation Based on Object Oriented Mapping Parameter Estimation; Signal Processing, Elsevier Science Publishers B.V. Amsterdam, NL, Oct. 1988, No. 3, pp. 315-334.
European Search Report for Application No. 06252798.1 and Annex thereto, dated Mar. 28, 2007, 7 pages.

* cited by examiner

*Primary Examiner* — Jefferey Harold
*Assistant Examiner* — Omer Khalid
(74) *Attorney, Agent, or Firm* — Conley Rose, P.C.

(57) ABSTRACT

The invention provides a method of frame interpolation, the method comprising: receiving first and second frames from an input video stream; generating an interpolated frame for arranging between the first and second frames in a processed video stream so that the second video stream has a different higher frame rate than the input video stream, wherein generating the interpolated frame comprises: identifying one or more moving objects within the first frame; segmenting the or each of the identified moving objects; and, determining motion parameters for each of the segments of the segmented objects.

13 Claims, 11 Drawing Sheets

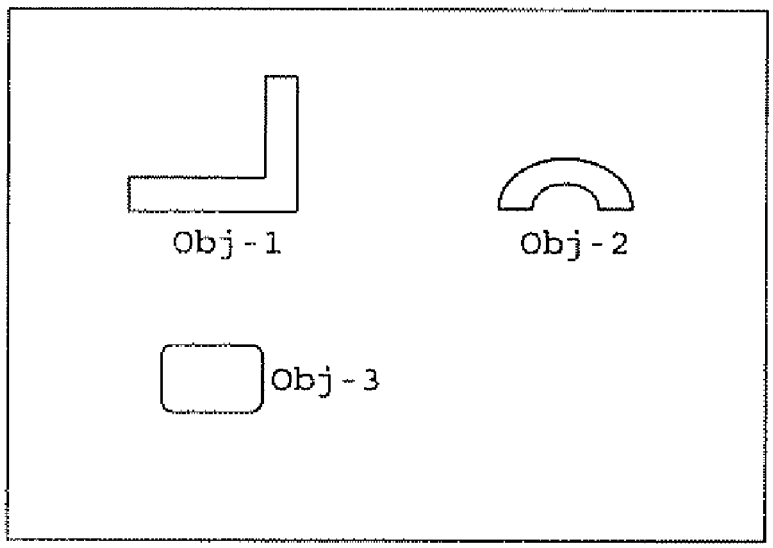
frame(N)
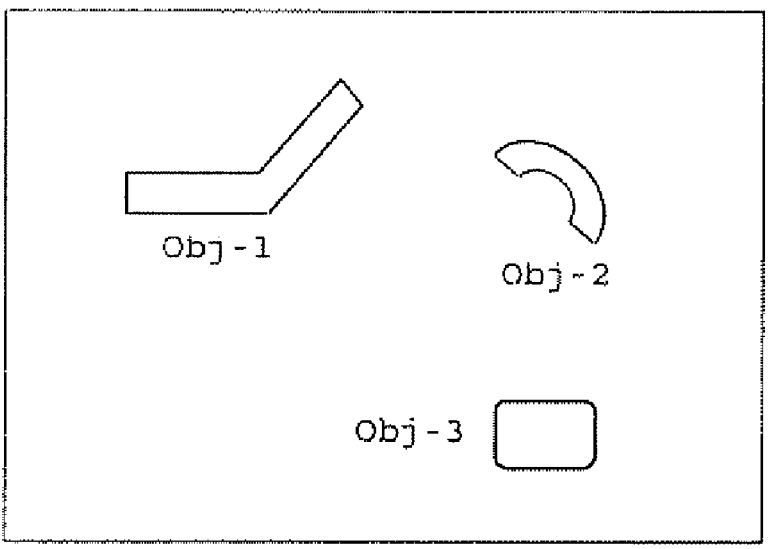
frame(N+1)
Figure 2

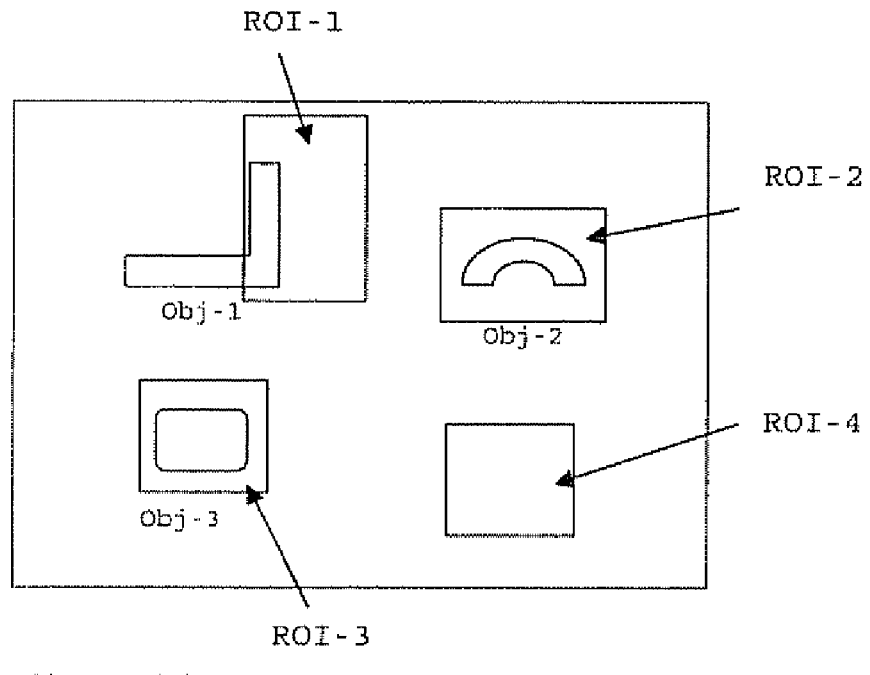
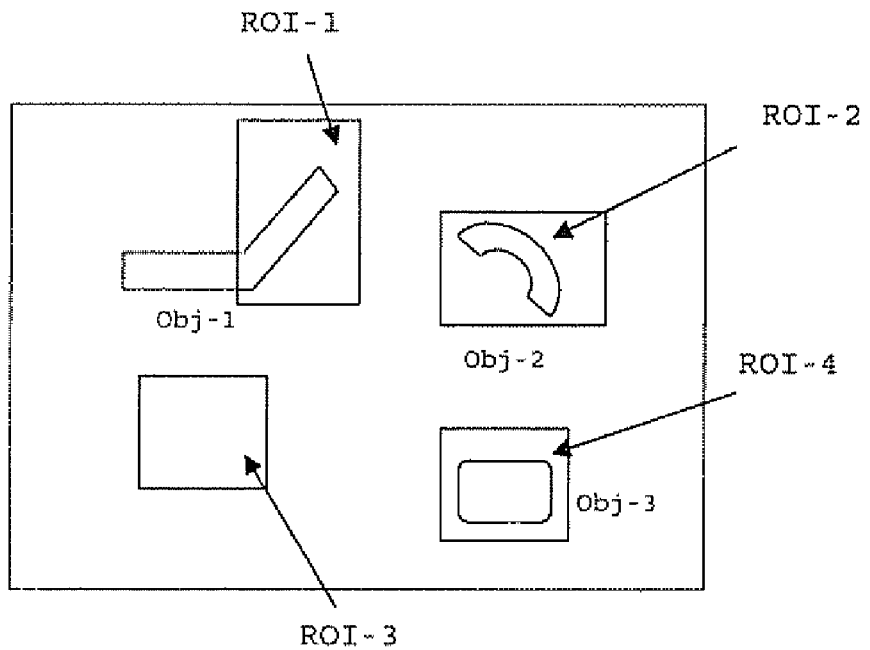
Fig.4

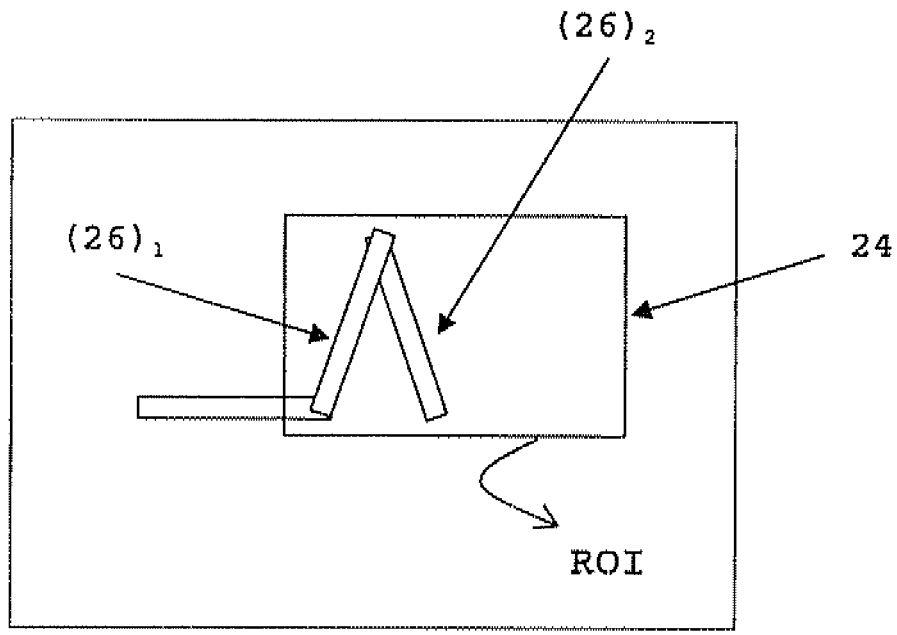
A rigid body in frame(N)
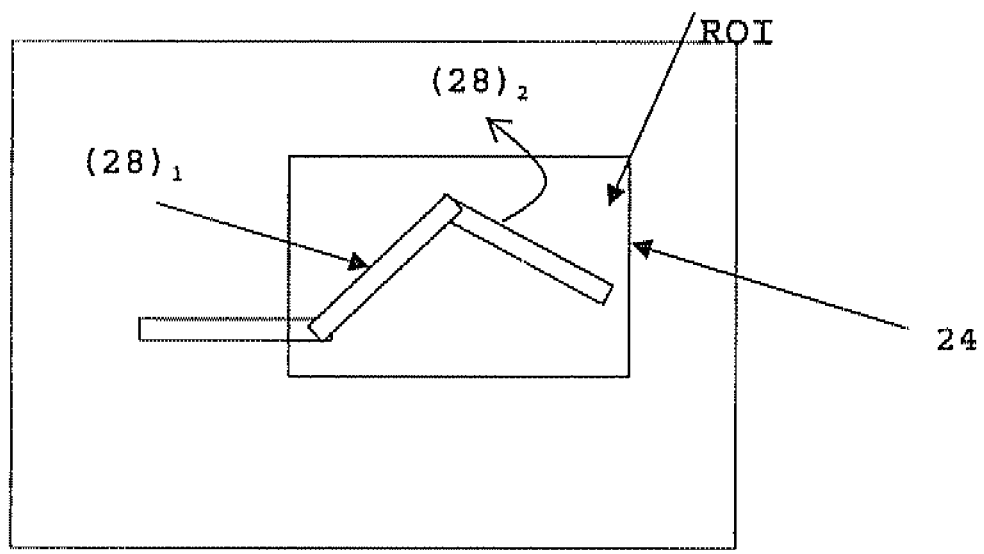
A rigid body in frame(N+1)
Fig. 5

For Frame(N):
- Rigid Body 1 (ROI-1)
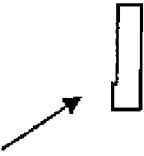
Note that the left side is divided by the border of ROI
- Rigid Body 2 (ROI-2)
- Rigid Body 3 (ROI-3)
- ROI-4 is empty
For Frame(N+1):
- Rigid Body 1 (ROI-1)
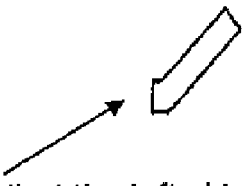
Note that the left side is divided by the border of ROI
- Rigid Body 2 (ROI-2)
- Rigid Body 3 (ROI-4)
- ROI-3 is empty

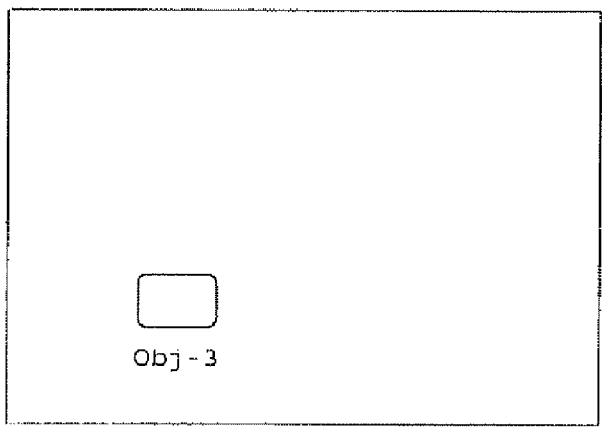
Movement Phase 1
Rigid body 2 in frame(N)
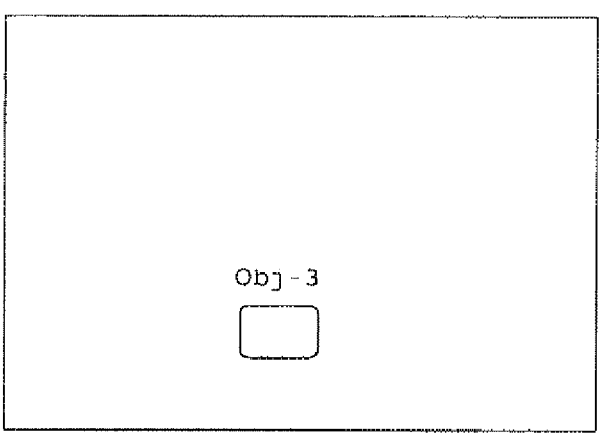
Movement Phase 2
Rigid body 2 in iframe
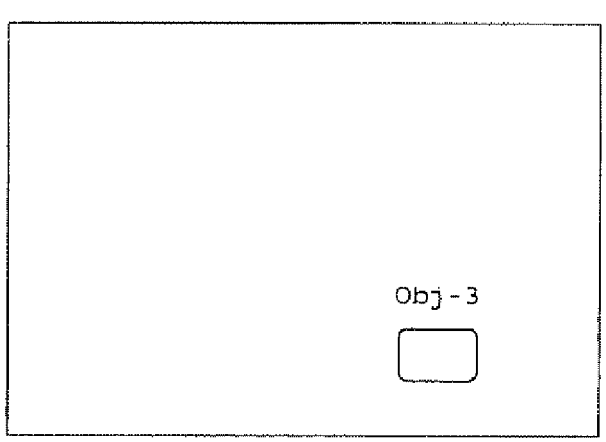
Movement Phase 3
Rigid body 2 in frame(N+1)
Fig.6

In frame(N)        In frame(N+1)

Rigid body 1 in frame(N)    Rigid body 1 in iframe Rotation angle=a/2    Rigid body 1 in frame(N+1) Rotation angle=a

METHOD AND APPARATUS FOR FRAME INTERPOLATION

CROSS-REFERENCE TO RELATED APPLICATION

This application claims the benefit of priority to U.S. application Ser. No. 60/803,538 filed May 31, 2006, the content of which is hereby incorporated by reference in its entirety for all purposes.

FIELD OF THE INVENTION

The present invention relates to a method and apparatus for frame interpolation. In embodiments the invention also relates to a television set including an apparatus for frame interpolation.

BACKGROUND OF THE INVENTION

A video is made up of plural frames, each frame being a still image, the effect of showing consecutive frames being to give the impression of movement. The frame rate of videos is generally sufficiently high such that a viewer cannot perceive the individual frames but rather perceives a continuous moving image.

On some television displays it is desirable to increase the frame rate from that at which the video being displayed was originally captured. This can be due to increase frame rate requirement for display in accordance with a different standard from that at which the video was captured.

In addition, many of the latest high-performance television sets, particularly large screen and wide screen (16:9 format) versions, use a 100 Hz screen refresh rate instead of the conventional 50 Hz refresh rate. This is primarily to avoid screen flicker, which becomes more perceptible and annoying to the viewer as the screen size increases. However, standard television broadcast transmissions only contain 50 frames per second. Therefore if television is being watched on one of the latest high-performance television sets, the frame rate must somehow be doubled.

Such increase in frame rate is referred to as frame rate up-conversion. Frame rate up-conversion is used to eliminate large areas flicker on a television screen. Motion judder is a problem that can arise in such situations with some types of up-conversion that are currently used.

While up-converting, i.e. subjecting a video to up-conversion, new interpolated frames are added to the original or source video stream. Typically, one interpolated frame is determined and added temporally between two existing frames. A known method for achieving this up-conversion or frame interpolation is to show each original frame twice. This is an acceptable solution in static regions but problems occur in moving areas of the displayed video. The problems are referred to as "motion judder" and blur and they cause degradation in visual quality which is undesirable.

One known method for frame interpolation is described in the paper entitled Real-time 2-3 Pull-Down Elimination Applying Motion Estimation/Compensation In A programmable Device, by R. J. Schutten and G. de Hann of Philips Research Laboratories, Eindhoven, the Netherlands. In this document a method of frame interpolation is described in which motion estimation is utilized to enable judder-free display of movie material. The method described utilizes a complex algorithm by which motion estimation is achieved by sub-sampling original frames from a video to be up-converted.

The motion of an object in the frame is described using a simple translational model and parameters are then estimated for the model to obtain a useful description for an object in the image. The motion parameters are then selected from a number of identified candidates based on a cost-function analysis. Last, segmentation occurs. This is described as an extremely important step in the algorithm. Its task is to assign one motion model to each group of pixels. This is achieved by assigning the best matching model to each group of pixels, which is typically as large as 8×8 pixels.

The algorithm is extremely complex and expensive computationally.

US-A-2003/0194151 discloses a method of temporal interpolation of an image sequence using object-based image analysis. The method comprises the steps of image segmentation for partitioning a known image into objects, motion estimation, object-based motion field processing, determination of object depth order and graceful degradation for alleviating visible artifacts.

BRIEF SUMMARY

According to a first aspect of the present invention, there is provided a method of frame interpolation for a video stream comprising generating an interpolated video frame for arrangement between first and second frames in a video stream, the method comprising: identifying one or more moving objects within the first frame; segmenting the or each of the identified moving objects; and, determining motion parameters for each of the segments of the segmented objects.

The method requires the steps of segmenting the or each of the identified moving objects and once this has been done determining motion parameters for each of the identified objects. In contrast to conventional methods of frame interpolation where motion parameters are determined for objects prior to segmentation using block or pixel based approaches (one motion parameter is determined for each pixel or block), in embodiments of the present invention the motion parameter estimation is performed after segmentation. This enables a reduction in the complexity of the motion parameter estimation since there are fewer object segments than pixels or pixel blocks.

Of course within any single frame any object is stationary. It may only actually be moving when the frame is viewed in sequence with other frames. In the present specification a "moving" object within any particular frame is an object that would be moving were the frame in question viewed in sequence with other frames.

The method may be used in all types of progressive displays when judder-free frame rate up-conversion is needed. It can also be used as a pull-down method, i.e. conversion of cinema film to video material. Also a software implementation may be provided as part of a computer or PC-based image processing software package.

Preferably, the step of determining motion parameters for the or each of the segments comprises identifying for at least one of the segments of the first frame a match in the second frame. Preferably, once a matching pair of segments has been found, motion parameters for the segment are determined. In a preferred embodiment, the position of a corresponding segment in the interpolated frame is determined in dependence on the determined motion parameters for the segment in the first frame.

Preferably the step of segmenting an object comprises the step of determining the luminance values for pixels in the object and segmenting the object in dependence on the determined luminance values.

In known methods of frame interpolation that involve segmentation of objects, segmentation is performed using the motion parameters of the object. This is computationally expensive and undesirable. This problem is overcome by a preferred embodiment of the present invention in which object segmentation is performed based on luminance values of pixels within an object. Other picture parameters could be used also or instead to segment an object.

Furthermore in some know methods, such as that described in US-A-2003/0194151, a so-called "segmentation" process requires analysis of each entire frame so as to identify motion vectors for each and every pixel in the image. This is complex and computationally expensive. In contrast in an embodiment of the present invention, segmentation only occurs in relation to moving objects within an image. Thus an algorithm used to perform the image processing is more simple and computationally efficient.

According to a second aspect of the present invention, there is provided a method of a method of up-converting the frame rate of a first video stream thereby generating a second processed video stream, the method comprising:

receiving a first video stream at a first frame rate;

generating interpolated frames for arranging temporally between pairs of frames in the first video stream;

collating the frames of first video stream with the generated interpolated frames to produce the second processed video stream having a frame rate higher than the frame rate of the first video stream, wherein the step of generating interpolated frames comprises a method of frame interpolation according to the first aspect of the present invention.

According to a third aspect of the present invention, there is provided apparatus for frame interpolation of a video stream, the apparatus comprising: a processor for extracting first and second frames from a first video stream and generating an interpolated frame for arrangement temporally between the first and second frames in a second video stream, the processor having: an identifier for identifying one or more objects within the first frame; a segmenter for segmenting the or each of the identified objects; and, a determiner for determining motion parameters for each of the segmented objects.

According to a fourth aspect of the present invention, there is provided a frame rate up-converter for up-converting the frame rate of a first video signal, the frame rate up-converter being arranged to receive the first video signal and generate interpolated frames for interspersing with the frames of the first video signal, the frame rate up-converter including apparatus according to the third aspect of the present invention.

According to another aspect of the present invention, there is provided a method of frame interpolation, the method comprising: receiving first and second frames from an input video stream; generating an interpolated frame for arranging between the first and second frames in a processed video stream so that the second video stream has a different higher frame rate than the input video stream, wherein generating the interpolated frame comprises: identifying one or more moving objects within the first frame; segmenting the or each of the identified objects; and, determining motion parameters for each of the segmented objects.

BRIEF DESCRIPTION OF THE DRAWINGS

Examples of the present invention will now be described in detail with reference to the accompanying drawings, in which:

FIG. 2 is schematic diagram of two consecutive frames in an original video stream;

FIG. 4 is a schematic representation showing regions of interest within the frames of FIG. 2;

FIG. 5 is a schematic representation of a rigid body in each of the frames of FIG. 2;

FIG. 6 shows two frames in which the position of a moving rigid body is shown;

DETAILED DESCRIPTION OF PREFERRED EMBODIMENTS

Figure 1:
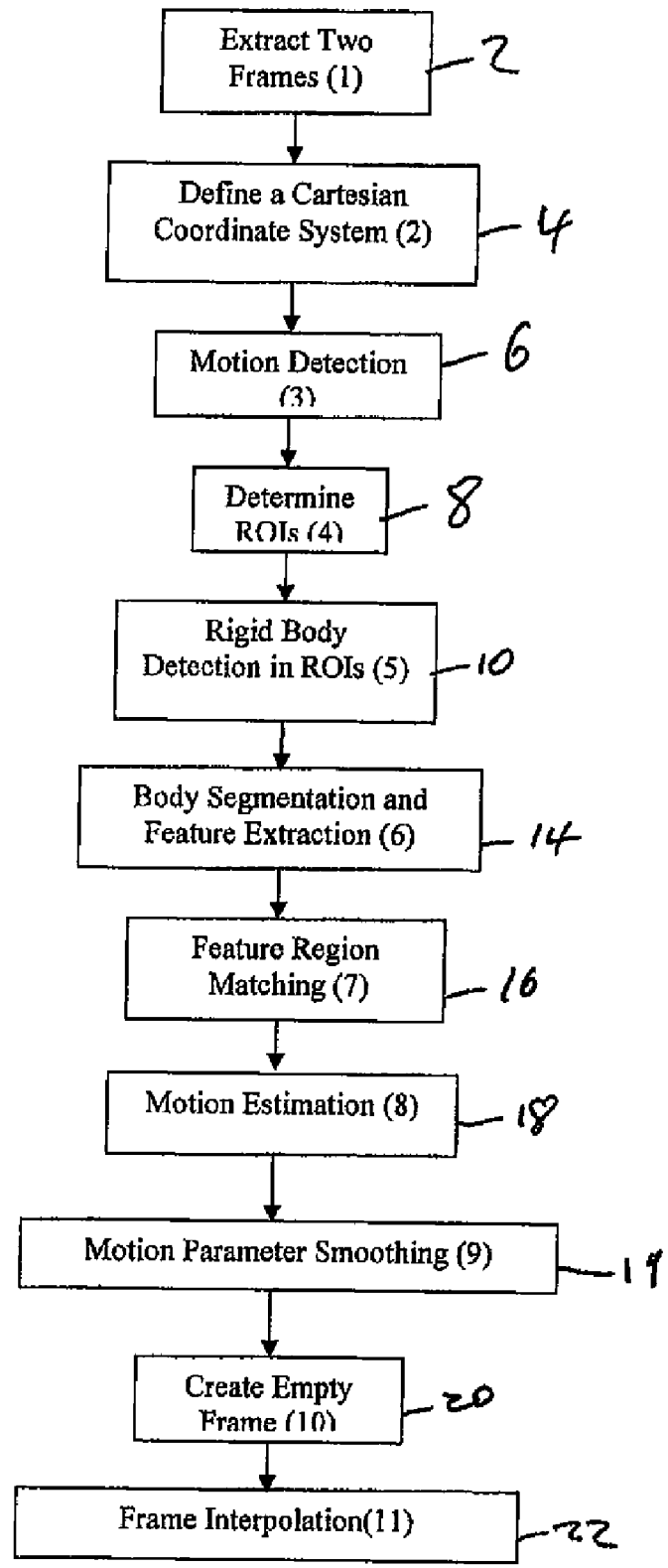
FIG. 1 is a schematic flow diagram of steps of a method according to a particular embodiment of the present invention.

FIG. 1 is a schematic flow diagram of the steps of a method according to a particular embodiment of the present invention. Initially, at step 2, two consecutive frames are extracted from a first video stream to be processed. Next, at step 4, a coordinate system is defined for the extracted frames, such as a Cartesian coordinate system. Next, at steps 6 and 8 moving areas within the consecutive extracted frames are detected and the regions of the extracted frames in which the moving pixels are positioned are identified as regions of interest ROI. At step 10 object detection within the ROIs is performed to identify rigid bodies within the ROIs. A rigid body need not be a singular item with respect to the subject matter of the frame. Rather, it is a system of particles or component parts in which the relative distance between the particles or component parts does not vary.

At step 14 object segmentation and feature extraction is performed. The detected bodies are segmented into smaller parts referred to as "feature regions" (FRs). This may be based on average luminance, average colour and shape indices. In any event, these parameters are calculated for each rigid body and feature regions are thus identified. Geometric centres are then determined for each identified feature region.

At step 16, matching is performed for feature regions in each of the two consecutive frames. For each feature region in frame (N), a match is sought in frame (N+1). To match a feature region in frame (N) with one in frame (N+1) a match coefficient of a feature region couple is used. As will be explained below, the match coefficient may be calculated using average luminance difference, average colour difference and shape indices difference of feature regions.

Next, at step 18 motion estimation is performed. For each feature region the type of motion of the feature region is identified and estimated. Preferably, the motion may be categorised as pure rotational movement, pure translational movement or a mixture of the two. For translational motion and rotational motion, distance and rotation angle are calculated for each feature region. As part of the motion estimation, at step 19, for each feature region the motion parameters (motion vector, rotational angle) are smoothed, as will be explained in detail below.

Next, at step 20 an empty frame is created between the two frames (N) and (N+1). In the temporal domain the empty frame is positioned between frame (N) and frame (N+1). The empty frame is of the same physical dimensions (width and height) as the frames (N) and (N+1). The empty frame is to be reconstructed and positioned within an output video stream so as to provide a bridge or a link between the frames (N) and (N+1).

The new frame may be referred to as an "interpolated frame", as using data from the images of frames (N) and (N+1) the image content of the new frame is interpolated. The interpolated frame must be reconstructed. To do this, initially static regions from the original frames (N) and (N+1), i.e. regions not identified as regions of interest, are copied to the interpolated frame. Next at step 22, new positions of the feature regions are calculated and the newly calculated frame or interpolated is formed. The method will now be described in detail with reference to FIGS. 2 to 11.

FIG. 2 is a schematic diagram of two consecutive frames, frame (N) and frame (N+1), of an original video stream. As will be described below, an interpolated frame (I) is to be calculated for positioning temporally between frame (N) and frame (N+1) in an output or processed video stream.

Figure 3:
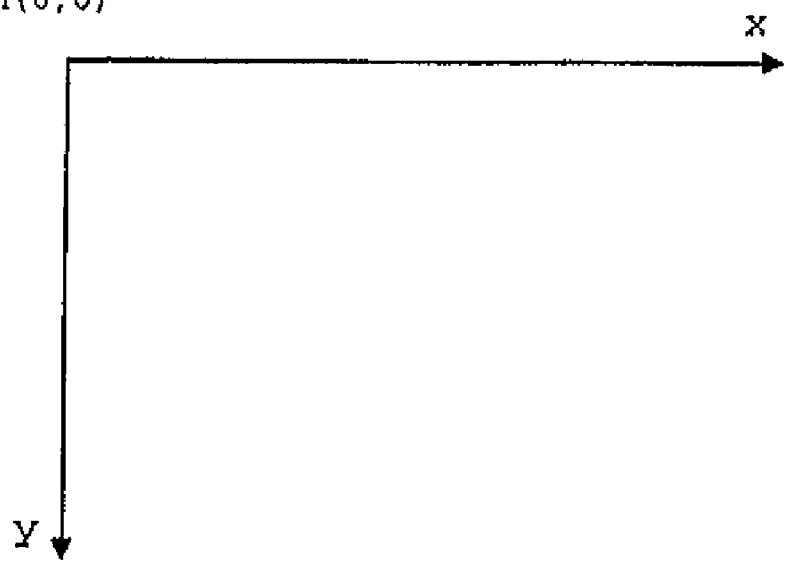
FIG. 3 is a diagram of a Cartesian coordinate system used in the generation of an interpolated frame.

Referring to FIG. 2, within frame (N) and frame (N+1) a number of objects obj-1 to obj-3 can be seen. Given that the objects are in different positions or orientations in frame (N+1) compared to frame (N), the objects are in motion within the video. Initially, as shown in FIG. 3, a Cartesian coordinate system is defined for the frames having an origin in the upper left corner of the frame. Of course, this is for convenience and in fact the origin can be defined at any position within the frames.

For every pixel in the frames, a determination is made as to whether or not the pixel is moving or stationary. This may be done in any convenient manner but preferably is achieved as follows:

A pixel is defined having coordinates (i,j) within the Cartesian coordinate system described above and shown in FIG. 3. The luminance of the pixel at (i,j) of frame (N) is defined as Y(N)(i,j). The luminance of the pixel (i,j) in frame (N+1) is defined as Y(N+1)(i,j). A comparison is made of the luminance values of these pixels. If the absolute difference between Y(N)(i,j) and Y(N+1)(i,j) is greater than some defined threshold, then the pixel is identified as a moving pixel and assigned to a moving region of each of the frames. Moving pixels within the frames constitute moving regions. The process is repeated for each pixel for all values of i and j between 0 and the limits defined by the size of the frames.

The threshold luminance level may be determined empirically. Clearly, by varying the threshold level, the sensitivity of the detection algorithm is varied. If a YUV colour space is used in which Y is the luminance and U and V are chrominance components, an 8 bit system may be used. This means the available range for each of the parameters Y, U and V is 0 to 255. Within this range, a threshold of 30 is selected and this is shown to provide satisfactory results.

Referring to FIG. 4, the moving regions are selected by having rectangles or some suitable shape drawn around them. As shown in FIG. 4, the regions of interest for both of frames (N) and (N+1) are the same. The rectangles are referred to as regions of interest (ROI) and the same ROIs are applied to both frames. In this example, there are four regions of interest ROI-1 to ROI-4 in each of the frames (N) and (N+1).

FIG. 5 shows in detail an example of a region of interest from two consecutive frames of a video. The region of interest 24 is the same in each of frames (N) and (N+1) but the body within the region of interest has clearly moved. Indeed, it is the movement of the body within the region of interest 24 that defines the positioning of the region of interest.

Next, borders between moving and stationary regions within a region of interest are detected. Initially, a binary image for the region of interest is created by setting moving pixels to a value 1 and stationary pixels to a value 0 within the region of interest. Next, dilation is applied to the binary image, which has the effect of removing holes from the inner parts of the moving region. Dilation can be applied to a full image or a part of an image. In the present case, dilation is used to remove holes inside moving regions. A structuring element, such as a square, is used to perform the dilation. Edge detection is then applied to identify a border that separates the moving and stationary regions. FIG. 5A shows the rigid bodies in frames (N) and (N+1).

Next, as explained above with reference to FIG. 1, at step 14 body segmentation occurs. The bodies within the regions of interest are segmented into smaller parts, preferably based on the luminance values of pixels within the bodies. Each segmented body part is identified as a feature region FR. If a body has no feature regions based on luminance values (or however else the feature regions are identified), then the body is uniform. For the purpose of later steps of the present method the complete body is treated as if it is a single feature region.

Referring again to FIG. 5, it can be seen that there are two feature regions within the ROI 24 in frame (N) these being numbered $26_1$ and $26_2$. Similarly, within the region of interest 24 in frame (N+1) the two feature regions are numbered $28_1$ and $28_2$. Using the Cartesian coordinate system described above with reference to FIG. 3, for each feature region, the boundary length is determined by counting the boundary pixels. Next, the geometric centre of the boundary pixels is calculated using a suitable algorithm. The geometric centre is referred to as the feature point (FP) of the feature region. Next, the average luminance of each feature region is determined. The average colour vector magnitude is also calculated for each feature region. To achieve this, summations may be used as follows:

Denote the number of pixels in a particular FR as n;

Let (i,j) be the coordinates of a pixel inside the boundary of FR, and (in YUV space) the luminance of that pixel be equal to Y(i,j). This then gives $$\text{Average Luminance} = \sum_i \sum_j Y(i, j) \cdot \frac{1}{n}$$

Average Colour Vector Magnitude =

$$\left( \left( \sum_i \sum_j U(i, j) \cdot \frac{1}{n} \right)^2 + \left( \sum_i \sum_j V(i, j) \cdot \frac{1}{n} \right)^2 \right)^{1/2}$$

in which

V(i,j)=V chromaticity component of a pixel in YUV colour space; and

U(i,j)=U chromaticity component of a pixel in YUV colour space.

For the calculation of the border length of a feature region, different methods can be implemented. As an example, by counting the boundary pixels, the boundary length may be determined.

Next, as described above with reference to step 16 of FIG. 1, feature regions are matched between frames (N) and (N+1). To match the feature regions, suitable matching criteria must be defined. In one example, average luminance, average colour vector magnitude and shape index may be used as the matching criteria between feature regions, in which shape index is defined as follows:

Shape index=$P/Q$ in which
P=Border length of the FR; and,
Q=Longest line on the border of the FR.

As will be explained below, the determination of the "longest line on the border of the feature region" is explained below. A threshold for the difference of each of these criteria is then set and used in processing of the images as explained below when the matching method is described in greater detail.

Three parameters are defined as follows.
Average luminance difference threshold: lumathr
Average colour vector magnitude difference threshold: chromathr
Shape index difference threshold: shinthr When finding a match for a feature region in frame (N), the criteria are compared with those of the feature regions in frame (N+1). The difference of each of the three parameters should be less than some defined threshold to make a match. The thresholds can be defined in any suitable way but typically may be determined empirically.

A method of matching a feature region will now be described with reference to table 1 below.

TABLE 1

| FR number | Average Luminance | Average Colour Vec. Mag. | Shape Indices |
|---|---|---|---|
| FR(N)-1 | 100 | 59 | 2.8 |
| FR(N)-2 | 28 | 69 | 4.3 |
| FR(N)-3 | 45 | 24 | 1.5 |
| . | .. | .. | .. |
| . | .. | .. | .. |
| . | .. | .. | .. |
| FR(N)-n | 75 | 56 | 3.6 |

A table is established for each of frames (N) and (N+1). In the example shown above, the table is for frame (N) but it will be understood that a corresponding table is established for frame (N+1). For each of the feature regions 1 to n the average values for the luminance and colour vector magnitude are calculated as described above. In addition, a value for the shape index is determined.

Matching of feature regions may then be performed as follows. The first feature region in the feature region table of frame (N) is denoted as FR(N)-1. In addition, feature regions in the frame (N+1) are identified as FR(N+1)-n.

Then each FR(N+1)-n is inspected and the values for the parameters average value for luminance, colour vector magnitude and shape index are calculated or determined as described above. The differences of average luminance, average colour and shape index between FR(N)-1 and all the FR(N+1)-ns is made. For a particular couple, if the difference for each of the three parameters is less than the corresponding thresholds set above, then this FR(N+1)-n has a chance of being a match for FR(N)-1. Since this feature region couple has a chance of being matched, the match coefficient for the couple must be determined. This is achieved by the following equation:

Match coefficient=$\Delta AL \cdot \Delta CVM \cdot \Delta SI$ in which:
$\Delta AL$=Average luminance difference;
$\Delta CVM$=Average colour vector magnitude difference; and
$\Delta SI$=Shape index difference.

The process is repeated and all the possible matches are identified and a corresponding match coefficient calculated. The FR(N+1)-n with the lowest match coefficient is taken as the match for the feature region FR(N)-1. Then the process may be repeated for FR(N)-2 and so on to FR(N)-n.

If a match cannot be found for a feature region in frame (N) then its motion parameters must be found in the motion parameters smoothing step to be described in detail below. If a match cannot be found for a feature region in frame (N+1) then no action is taken.

Next, once feature regions have been matched in frames (N) and (N+1), it is necessary to determine the motion that the feature region has undergone. First, the feature point of each matched feature region in frame (N) and frame (N+1) is calculated using the Cartesian coordinate system described above. Next, the feature point of a corresponding feature region to be formed in the interpolated frame is calculated in accordance with the following equation. FP of FR in interpolated frame equals $(x_i, y_i)$ where $$x_i = (x_1 + x_2)/2$$

$$y_i = (y_1 + y_2)/2$$

in which:
FP of the FR in frame (N)=$(x_1, y_1)$
FP of the matched FR in frame (N+1)=$(x_2, y_2)$
The motion vector for this feature region is therefore:

$$\begin{pmatrix} x_2 - x_1 \\ y_2 - y_1 \end{pmatrix}$$

Figure 7:
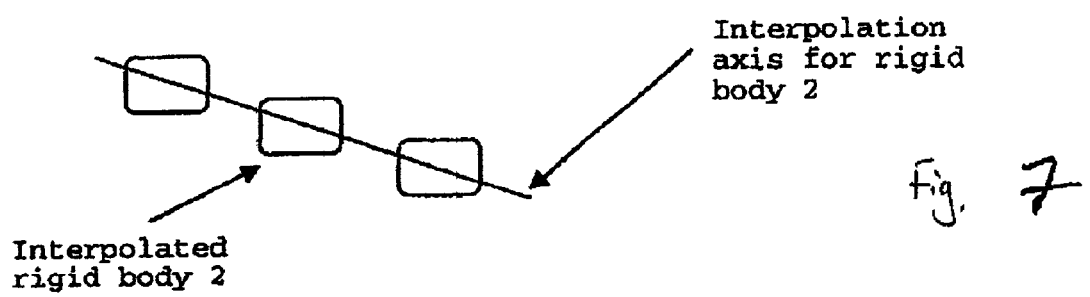
FIG. 7 is a schematic representation of an interpolated position of a rigid body within a frame.
Figure 8:
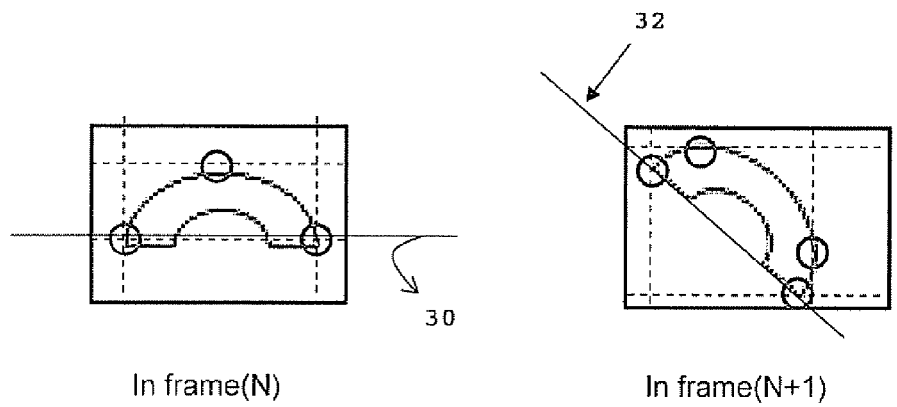
FIG. 8 shows two consecutive frames in which the position of a rotating rigid body is shown.

Referring to FIGS. 6 and 7, the effect of this process can be seen clearly. In FIG. 6, the positions of rigid body 2 in each of frame (N) and frame (N+1) is shown respectively as movement phases 1 and 3. Next, in movement phase 2, the position of the rigid body in the interpolated frame is shown. With reference to FIG. 7, the position of the rigid body with respect to the position in frames (N) and (N+1) can be seen to be halfway between the two, as would be expected using the equations described above.

Where rotational motion of a feature region also occurs, the position of the feature region in the interpolated frame may be determined as follows. Referring to FIG. 8, a rigid body is shown in each of frames (N) and (N+1). First, lines are used to determined four points that are closest to the region of interest boundary. Along these four points, the two that are furthest apart are used to define a line. With reference to frame (N), this is shown as the line 30 and it may be referred to as a "reference line". The method is also used to find the longest line on the border of the feature region.

For the matched feature region in frame (N+1), again four points on the feature region boundary that are closest to the region of interest boundary are identified. Amongst these four points the two that a furthest apart from each other again are used to define a line referred to as the "match line" 32. The rotation angle of the object is the angle between the match line and the reference line. Thus, the angle of rotation of the feature region from frame (N) to frame (N+1) is determined and is assigned the value 2a degrees. Therefore, to determine the angle of rotation of the feature region between the frame (N) and the interpolated frame, an angle of rotation is assigned to the reference line 30 of a degrees.

If there is more than one point at the same distance to a border line, then again two of the points are taken which are furthest apart from each other to determine the match line or reference line.

Figure 9:
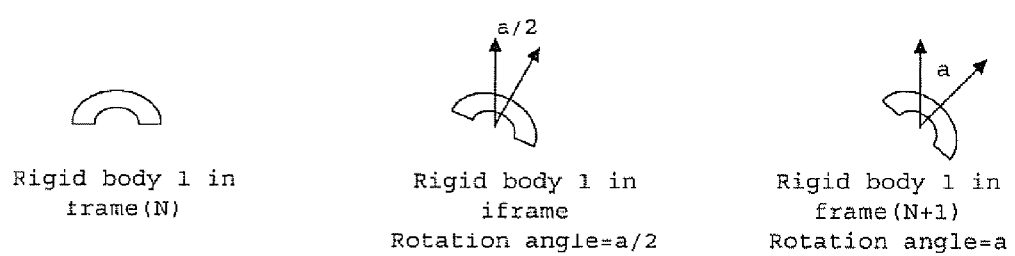
FIG. 9 shows the movement phases for the rotating body of the frames of FIG. 8 together with an interpolated movement phase.

Referring to FIG. 9 the rotational movement of the rigid body 1 in frame (N) can be seen to exist within the three movement phases 1 to 3. As shown, in the interpolated frame a movement phase 2 is assigned to the body such that the angle of rotation relative to the angle of rotation in the frame (N) is half that of the magnitude of the rotational angle between frames (N) and (N+1).

At this stage, motion vectors and rotational angles have been determined for each feature region and therefore it is possible now to create a frame that could be positioned temporally between the frame (N) and (N+1). However, before the interpolated frame is generated, it is preferred that some smoothing of the motion parameters is performed. The motion parameters are the motion vector and the rotational angle. In the smoothing process, the motion parameters of a feature region and those of neighbouring feature regions are taken into account to determine smooth motion parameters for each feature region.

The aim of the smoothing process is to eliminate or reduce any errors in the motion estimation. Preferably, in the smoothing process, motion parameters of a feature region are evaluated with respect to those of one or more neighbouring feature regions. Since neighbouring feature regions are typically expected to remain close to each other if smoothing estimates that one feature region is moving errantly, its motion parameters may be corrected.

To find the smooth motion parameters for a feature region, the corresponding parameters of the neighbouring feature regions and the feature region under consideration are added. A simple average is taken by dividing the sum by the number of neighbours plus one (to take into account the feature region under consideration). If the feature region under consideration is an unmatched feature region, then its original motion parameters are taken as zero and the summation is divided by the number of neighbours only.

There now will be provided an example in which smoothing is applied to a feature region to determine the values for the motion parameters for the feature region to enable its position within the interpolated frame to be calculated accurately.

Denote a sample FR as sFR and suppose it has 3 neighbours
Denote first neighbour FR as n1FR
Denote second neighbour FR as n2FR
Denote third neighbour FR as n3FR
Denote the x component of the motion vector of a FR as FR(x)
Denote the y component of the motion vector of a FR as FR(y)
Denote the rotational angle of a FR as FR(a)

Smoothed x component of the motion vector of sFR is:

$$sFR(x)=(sFR(x)+n1FR(x)+n2FR(x)+n3FR(x))/4$$

Smoothed y component of the motion vector of sFR is:

$$sFR(y)=(sFR(y)+n1FR(y)+n2FR(y)+n3FR(y))/4$$

Smoothed rotational angle of sFR is:

$$sFR(a)=(sFR(a)+n1FR(a)+n2FR(a)+n3FR(a))/4$$

If sFR is an unmatched FR then $$sFR(x)=sFR(y)=sFR(a)=0$$

and the formula to find the smoothed x component $$sFR(x)=(n1FR(x)+n2FR(x)+n3FR(x))/3$$

the formula to find the smoothed y component $$sFR(y)=(n1FR(y)+n2FR(y)+n3FR(y))/3$$

the formula to find the smoothed rotational angle $$sFR(a)=(n1FR(a)+n2FR(a)+n3FR(a))/3$$

Once smoothing has been completed, interpolation is started by the creation of an empty frame with the same dimensions as the frame (N) and (N+1), as shown in step 20 of FIG. 1. The interpolated frame (frame i) will be in between frame (N) and frame (N+1) in the temporal domain. Presently, there are two movement phases for each feature region, one in frame (N) and one in frame (N+1). Initially, the movement phase for the feature region in the interpolated frame must be found. If the motion of the feature region is purely translational, then as described above, the new geometric position of the feature point is used to determine the positioning of the feature region within the interpolated frame. If the motion is purely rotational, then the angle of rotation "a" is used to determine the orientation of the feature region within the interpolated frame. If the motion of the feature region includes both translational and rotational components then both procedures must be applied.

The translational motion vector is calculated and feature point of the feature region is moved to a new position in the interpolated frame determined as described above. Then the coordinates of other pixels within the feature region are updated using translational motion parameters. As the next step, a rotation operation is applied to the updated FR pixels. The procedure is as follows:

The coordinates of feature point in iframe(rotation axis): (x0,y0)
The coordinates of pixel in frame(N): (xN,yN)
The coordinates of pixel in iframe: (xi,yi)
The x component of translational motion vector:tm(x)
The y component of translational motion vector:tm(y)
The angle of rotation from frame(N) to iframe:a
For translational motion:

$$xN=xN+tm(x)$$

$$yN=yN+tm(y)$$

Then, for rotational motion:

$$xi=(xN-x0)*\cos(a)-(yN-y0)*\sin(a)+x0$$

$$yi=(xN-x0)*\sin(a)+(yN-y0)*\cos(a)+y0$$

The rotation formula can produce coordinates which are not integers. So, there can be empty pixels or "blank points" at the end of the rotation operation. In order to generate the intensity of the pixels at each integer position median filtering can be used only for these black points.

Figure 10:
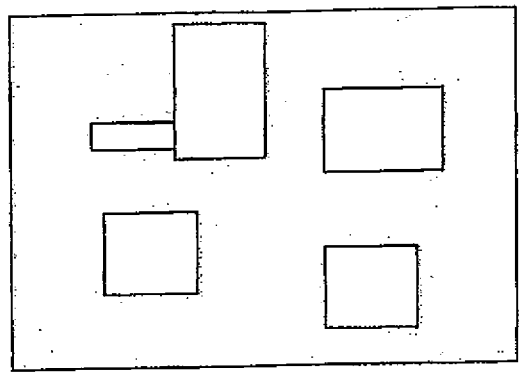
FIG. 10 shows an interpolated frame for insertion between the frames of FIG. 2.

To generate the interpolated frame for positioning between frames (N) and (N+1), areas inside the regions of interest other than rigid bodies, i.e. the background regions are copied from the frames (N) and (N+1) to the interpolated frame. Then, regions of frames outside the regions of interest are copied from the frames (N) or (N+1) to the interpolated frame. As shown in FIG. 10, once the feature regions are positioned within the interpolated frame, a complete frame is generated which can be positioned temporally between frame (N) and frame (N+1) in an output video stream.

The distance and direction of motion of a feature region is known and therefore its speed and position may be predicted for successive frames. The ability to predict the position of a feature region decreases the computational complexity. Body segmentation is necessary only when a scene change occurs or a new body enters the scene. In other words, instead of segmenting and calculating the coordinates of all bodies in each frame, predictions can be made and these can be checked. In fact, it is possible to note predictions for frames coming after frame (N+1).

Figure 11:
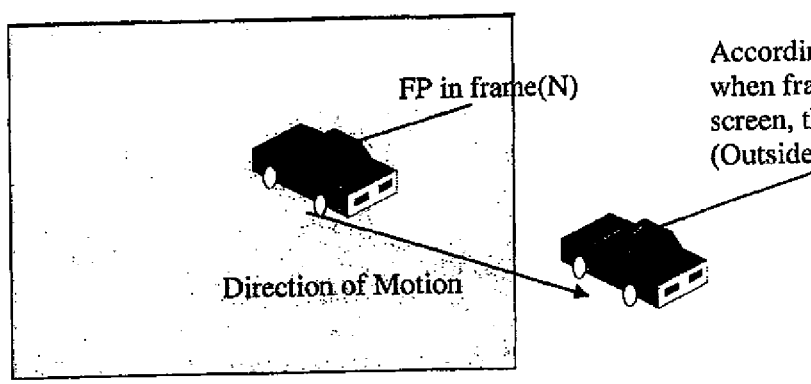
FIG. 11 shows a frame with a moving body.

FIG. 11 shows an example of a situation in which according to the method, it is estimated that a particular moving feature point actually appears outside the boundaries of frame (N+1).

In one example the estimation of position of the objects or feature regions in one frame may be used to determine the position of the corresponding object or feature region in a next interpolated frame. Thus, computational intensity can be reduced.

Consider an example in which there are three existing successive frames from a first video stream, i.e. from a video stream at a first frame rate, frame1, frame2, frame3. To increase the frame rate, interpolated frames should be added between these three frames. One interpolated frame will be added in between frame1 and frame2, another interpolated frame will be added in between frame2 and frame3.

To perform the first interpolation, initially frame1 and frame2 are taken and processed as described above, i.e. segmentation, feature region matching, motion estimation etc and so a corresponding interpolated frame is created.

Next in one example, the same process could be repeated to determine or calculate the interpolated frame to go between frame2 and frame3. In other words, the steps of segmentation, feature region matching, motion estimation between frame2 and frame3 can be repeated so as to create a corresponding interpolated frame.

Preferably, this entire process does not need to be repeated. In fact, typically the operations do not need to be repeated since, unless a scene change occurs or an object changes its direction of motion, the FRs in frame1, frame2 and frame3 will be identical or at least very similar. Whilst performing the interpolation to determine the frame for positioning between frame1 and frame2, the speed, direction of motion and rotational angle of these FRs using frame1-frame2 pair have been determined. Predictions about the locations of these FRs on frame3 can now be made and these prediction scan be checked. If the predictions are correct then the computationally intensive operations used in the interpolation are not required. Of course, if the predictions are false, then a full cycle of the frame interpolation method may be required to determine an interpolated frame for positioning temporally between frame2 and frame3.

Figure 12:
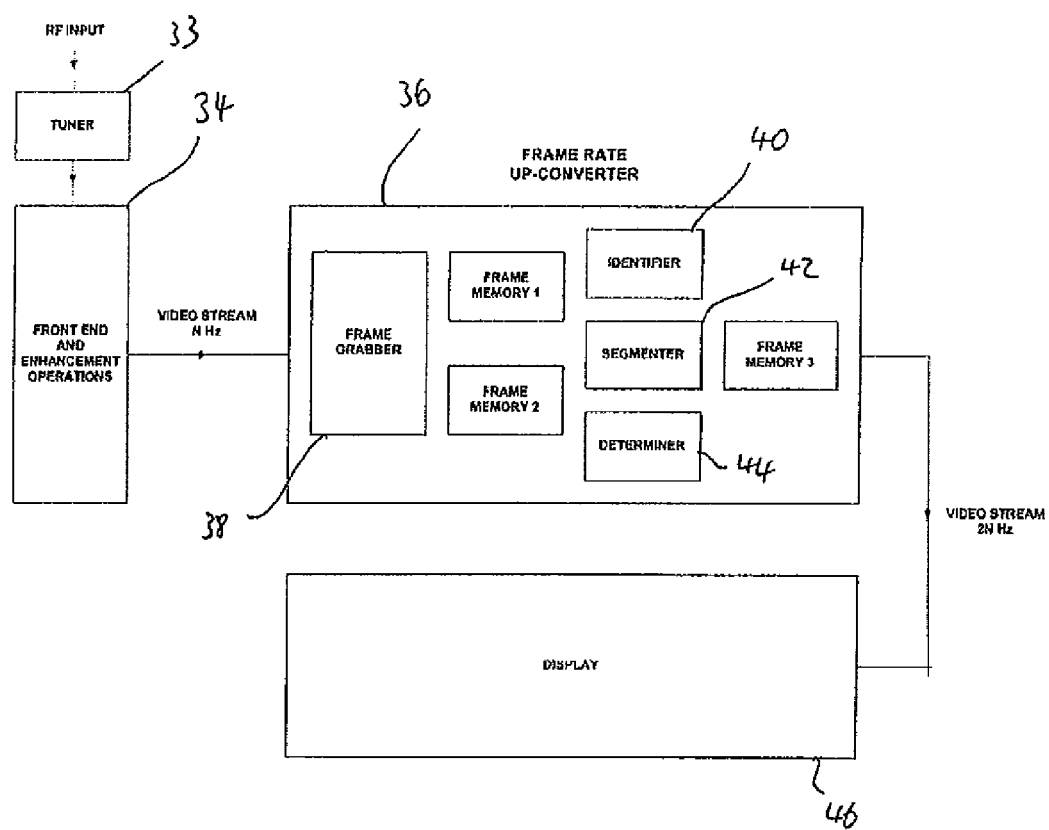
FIG. 12 shows a schematic representation of a television set.

FIG. 12 shows a schematic representation of a television set including a frame rate up-converter for converting the frame rate of a received video signal to a higher rate. The television set includes a receiver for receiving a first video signal. A processor is provided for receiving an input from the receiver and processing the received signal in a manner as described above to generate interpolated frames. The interpolated frames are arranged temporally in a desired sequence within the first video signal to form a second processed video signal having a frae rate higher than that of the first signal. As explained above with certain high definition television sets and/or wide screen formats such apparatus is highly desirable.

The television set comprises a tuner 33 in communication with a front end and enhancement operations unit 34. A frame rate up-converter is provided and is arranged to receive a video stream at a first frame rate. The frame rate up-converter 36 is arranged to generate interpolated frames and provide an output video stream at an increased frame rate. In the example shown, the first video stream received by the frame rate up-converter is at a frequency of N Hz and the second video stream is at a frame rate of 2N Hz.

The front end and enhancement operations unit 34 is arranged to apply various operations to a received signal and provide the enhanced or processed signal to the frame rate up-converter as the first video stream. The operations executed by the front end and enhancement operations unit 34 may include any or all of saw filtering, de-interlating, de-noising, sharpening, contrast enhancement or any other suitable enhancement operations. The enhanced signal is then provided to the frame rate up-converter 36 as the first video stream.

Referring now to the frame rate up-converter, typically it includes a frame grabber 38 used to capture frames from the video stream the grabbed frames are stored in memory and then operated on by an identifier 40 a segmenter 42 and a determiner 44. The identifier 40 is arranged to identify one or more moving objects within a frame. The segmenter 42 is arranged to segment the or each of the identified moving objects and the determiner 44 is arranged to determine motion parameters for each of the segments of the segmented objects. A further frame memory is provided for storing a generated interpolated frame for arrangement temporally between two appropriate frames. Last, a display 46 is provided for displaying the video as encoded in the second video output from the frame rate up-converter at a frequency of 2N Hz.

The television set of FIG. 12 could be any suitable type of television having the frame rate up-converter built in. The frame rate up-converter is typically provided as a chip for configuring within the television. It may be built in to the television or alternatively it may for a separate unit for connection between an aerial output for receiving a television signal from an external source and the television video input. It may be provided as software for storing on a microprocessor or chip forming part of a television or a separate unit for connection between an aerial output for receiving a television signal from an external source and the television video input.

Embodiments of the present invention have been described with particular reference to the examples illustrated. However, it will be appreciated that variations and modifications may be made to the examples described within the scope of the present invention.

The invention claimed is:

1. A method of frame interpolation for a video stream comprising generating an interpolated video frame for arrangement between first and second frames in a video stream, the second frame appearing after the first frame in the video stream, the method comprising:
(a) identifying one or more moving objects within the first frame;
(b) segmenting each moving object identified in step (a);
(c) determining motion parameters for each of the segments of the segmented objects;
(d) generating said interpolated video frame in dependence on said determined motion parameters; and,
predicting the position of objects within a third frame, the third frame appearing after the second frame in the video stream, wherein said predictions are dependent on only the motion parameters determined in step (c) for the first interpolated frame, checking said predictions against the third frame for a predetermined accuracy, and if accurate, using only said motion parameters for the first interpolated frame in generating a second interpolated frame for arrangement between the second frame and the third frame in the video stream, else if not accurate repeating steps (a) to (d) with the second and third frames, wherein the first, second and third frames are consecutive.

2. A method according to claim 1, wherein the step of determining motion parameters for the or each of the segments comprises identifying for at least one of the segments of the first frame a match in the second frame.

3. A method according to claim 2, wherein once a matching pair of segments has been found, motion parameters for the segment are determined.

4. A method according to claim 3, wherein the position of a corresponding segment in the interpolated frame is determined in dependence on the determined motion parameters for the segment in the first frame.

5. A method according to claim 2, wherein identifying for at least one of the segments of the first frame a match in the second frame comprises identifying all possible matches and performing analysis on the possible pairs to determine an actual match.

6. A method according to claim 5, wherein the analysis includes determining a match coefficient defined as follows:

Match coefficient=ABC in which A=Average luminance difference;
B=Average colour vector magnitude difference; and
C=Shape index difference.

7. A method according to claim 6, in which a match coefficient is determined for all possible matching pairs of segments and a match is formed between the two segments having the lowest match coefficient.

8. A method according to claim 4, wherein after a match has been established between all possible matching pairs of segments, values for picture parameters of the interpolated segments are smoothed.

9. A method according to claim 1 further comprising up-converting the frame rate of a first video stream thereby generating a second processed video stream, wherein said upconvertinq comprises:
receiving a first video stream at a first frame rate;
generating interpolated frames for arranging temporally between pairs of frames in the first video stream; and
collating the frames of first video stream with the generated interpolated frames to produce a second video stream having a frame rate higher than the frame rate of the first video stream.

10. A method according to claim 9, wherein the first video stream has a frame rate of NHz and the second video stream has a frame rate of 2 NHz.

11. Apparatus for frame interpolation of a video stream, the apparatus comprising:
a processor for extracting first and second frames from a first video stream, the second frame appearing after the first frame in the video stream and generating an interpolated frame for arrangement temporally between the first and second frames in a second video stream, the processor having
an identifier for identifying in a step (a) one or more objects within the first frame;
a segmenter for segmenting in a step (b) each object identified in step (a);
a determiner for determining in a step (c) motion parameters for each of the segmented objects;
a generator for generating in a step (d) said interpolated video frame in dependence on said determined motion parameters; and,
an predictor for predicting the position of objects within a third frame, the third frame appearing after the second frame in the video stream, wherein said predictions are dependent on only the motion parameters determined in step (c) for the first interpolated frame, checking said predictions against the third frame for a predetermined accuracy, and if accurate, using only said parameters determined in step (c)for the first interpolated frame in generating a second interpolated frame for arrangement between the second frame and the third frame in the video stream, else if not accurate, repeating steps carried out by steps (b) to (d) with the second and third frames, wherein the first, second and third frames are consecutive.

12. An apparatus according to claim 11, wherein the apparatus comprises to a frame rate up-converter for up-converting the frame rate of a first video signal, the frame rate up-converter being arranged to receive the first video signal and generate interpolated frames for arranging with the frames of the first video signal.

13. An apparatus according to claim 12, wherein the apparatus corresponds to a television set having
a receiver for receiving a television signal at a first frame rate; and
the frame rate up-converter for processing the received television signal.

* * * * *